UNITED STATES PATENT OFFICE.

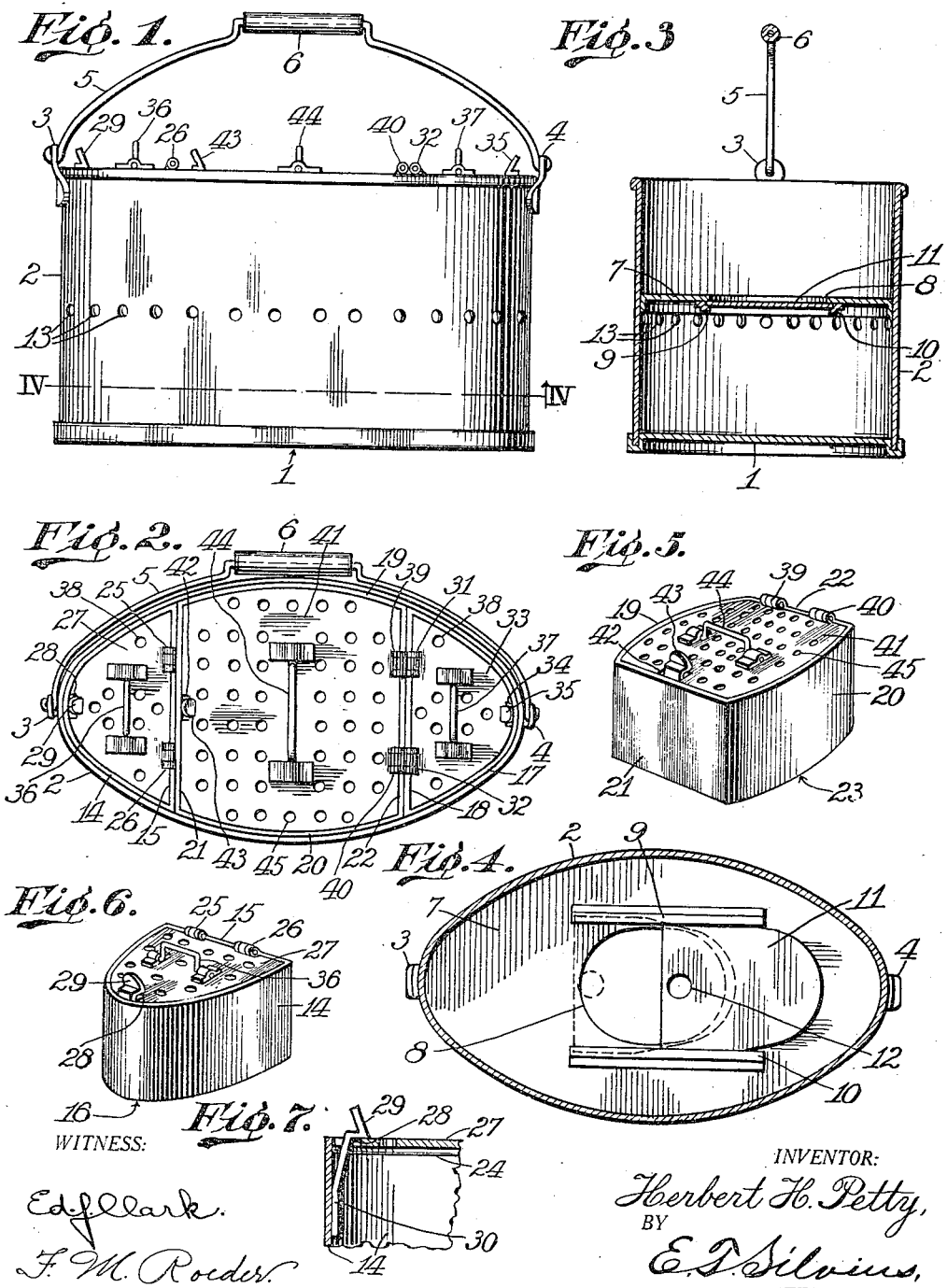

HERBERT H. PETTY, OF INDIANAPOLIS, INDIANA.

COMBINATION FISH AND BAIT BUCKET.

1,373,830. Specification of Letters Patent. Patented Apr. 5, 1921.

Application filed October 30, 1919. Serial No. 334,491.

*To all whom it may concern:*

Be it known that I, HERBERT H. PETTY, a citizen of the United States, residing at Indianapolis, in the county of Marion and State of Indiana, have invented a new and useful Combination Fish and Bait Bucket, of which the following is a specification, reference being had to the accompanying drawings and to the letters and figures of reference marked thereon.

This invention relates to a bucket that is designed to be used by fishermen and sportsmen, especially anglers or those who fish with hook and line requiring bait, the invention having reference particularly to a combination bucket in which both fish and different kinds of bait may be carried alive or in fresh condition.

An object of the invention is to provide a fish and bait bucket which shall be so constructed as to be adapted for separately carrying fish and also different kinds of bait at one and the same time and in a compact and convenient manner. Another object is to provide a fish and bait bucket of the above-mentioned character which shall not be costly but shall be very practical and convenient for securely carrying different kinds of bait and also the fish that may be caught. A further object is to provide a fish bucket which shall conveniently contain separate removable buckets or pails adapted to securely contain the bait required, and permit the bait bucket to be separately carried away to obtain a new supply of bait from more or less distant points. A still further object is to provide a fish and bait bucket which shall be so constructed as to have a plurality of ventilated compartments of which a number may be used to carry bait, and which shall be adapted to carry fish when the supply of bait has become exhausted or a particular kind of bait is not needed.

With the above-mentioned and other objects in view, the invention consists in a combination fish and bait bucket having a plurality of ventilated compartments adapted to hold water, each of novel form; and, the invention consists also further in the novel parts and combinations and arrangements of features and parts, as hereinafter particularly described and further defined in the accompanying claims.

Referring to the drawings,—Figure 1 is a side elevation of the bucket as preferably constructed; Fig. 2 is a top plan of the improved bucket; Fig. 3 is a transverse vertical central section of the bucket; Fig. 4 is a horizontal section approximately on the line IV—IV in Fig. 1; Fig. 5 is a perspective view of the main one of the bait buckets or removable compartments; Fig. 6 is a perspective view of one of two other removable bait buckets or compartments comprised in the combination bucket; and, Fig. 7 is a fragmentary sectional detail showing portions of the bait buckets or compartments.

Similar reference characters in the different figures of the drawings indicate corresponding elements or features of construction herein referred to in detail.

As preferably constructed the combination bucket is principally composed of suitable sheet metal and comprises a main receptacle or vessel and a plurality of separate receptacles or vessels removably supported in the main receptacle. The main receptacle has a bottom 1 and a side wall 2 on the bottom, the bottom being oval in plan and the contour of the side wall also oval in plan; and the end portions of the side wall are provided with bucket ears 3 and 4 to which a bail 5 is connected, the bail having a central handle 6 composed of wood or other suitable material. The bail is of suitable contour to permit it to be swung down over the side of the receptacle. The receptacle has a horizontal partition or floor 7 secured thereto at a suitable distance above the bottom 1 and it has a central aperture 8 therein through which to insert or remove fish which may be carried in water in the lower portion of the receptacle or vessel. The under side of the floor is provided with a pair of guides 9 and 10 in which a door 11 is slidingly supported so as to either close or open the aperture or doorway 8, the door having a finger-hole 12 therein to facilitate operation of the door. The wall 2 of the main receptacle or vessel has a horizontal row or series of perforations 13 through which to admit air into the lower portion of the vessel and permit ventilation of the fish-compartment.

The bait receptacles or vessels are designed to collectively conform to the contour of the oval main receptacle, there being a main or middle bait receptacle and two end receptacles, the end receptacles being alike but reversely arranged, each end receptacle being shaped approximately like a sad-iron in plan. One end receptacle comprises a semi-elliptical side wall portion 14 and a straight wall portion 15, and each receptacle has a bottom 16, so that the receptacle or vessel may carry water. The opposite end receptacle likewise has a curved side wall portion 17 and a straight wall portion 18. The curved wall portion of one end receptacle is arranged adjacent to the ear 3 and that of the other receptacle adjacent to the ear 4. The middle or main bait receptacle has two elliptically-curved side wall portions 19 and 20, two straight wall portions 21 and 22 and a bottom 23. The upper portion of the side wall of each bait receptacle or bucket has a ledge 24 on its inner side which may be composed of wire soldered to the wall, to support a lid or cover within the confines of the side wall.

The straight side wall portion of one end receptacle is provided with hinges 25 and 26 to which a cover or lid 27 is connected at its straight portion, the cover being of suitable shape in plan to fit into the side walls, and the opposite end thereof has a notch 28 to receive a catch or spring-latch 29 which has a shank 30 secured to the inner side of the curved wall portion 14, the catch being adapted to engage the top of the cover 27 to securely hold it in place on the ledge 24. The opposite end receptacle is likewise provided with hinges 31 and 32 to which a cover 33 is connected, the cover having a notch or recess 34 to receive a spring-latch 35 similar to the spring-latch 29. The covers or lids 27 and 33 are provided respectively with handles 36 and 37 whereby to lift and carry the vessels; and, the covers have perforations 38 to admit air into the vessels. The straight wall portion 22 of the main bait receptacle is provided with hinges 39 and 40 to which a cover 41 is connected, the cover being shaped in plan to correspond to the side wall of the receptacle, and the opposite end of the cover has a recess or notch 42 to receive a spring-latch 43 mounted on the inner side of the straight wall portion 21 whereby to removably secure the cover in place. The cover is provided with a carrying handle or bail 44 whereby the receptacle may be lifted and carried; and the cover has perforations 45 therein to admit air into the receptacle.

In practical use the bait buckets or receptacles may be supplied with suitable fishing bait, a different kind in the several buckets which may contain either water or soft earth as may be best suited to the needs of the bait. When starting on a fishing trip lunch or various articles may be carried in the lower portion or fish compartment of the main vessel and later removed when the space may be required for fish. In case one of the kinds of bait becomes exhausted the bait bucket may be removed from the main bucket and carried to a place where a new supply may be obtained. In case the fish compartment becomes filled with fish and more carrying space is needed, one of the bait buckets may become available for carrying home the larger number of fish. While the fishing proceeds the middle bait bucket may be removed from the main bucket so that the door 11 shall be accessible to be opened and permit the fishes to be placed in the fish compartment promptly when caught, the door to be closed to prevent the fish from escaping. The cover or lid of each bait bucket may be readily unlatched and opened when required.

Having thus described the invention, what is claimed as new is—

1. A combination fish and bait bucket having a lower compartment and an upper compartment and a passageway between the compartments, and a plurality of ventilated vessels of equal height collectively occupying the space and having their bottoms supported on one and the same horizontal plane in the upper compartment.

2. A combination fish and bait bucket having a lower ventilated compartment and an upper open-top compartment and a controlled passageway between the compartments, and a plurality of vessels in the upper compartment having each a perforate cover provided with a handle to carry the vessel.

3. A combination fish and bait bucket comprising a main vessel having a bottom and a side wall and a floor above the bottom secured to the side wall, the side wall having perforations below the plane of the floor, the floor having a central doorway; a door movably guided on the under side of the floor to close the doorway, a bail connected to the side wall of the vessel, a central receptacle on the middle portion of the vessel floor and covering the doorway therein, and two end receptacles on the vessel floor at opposite ends respectively of the central receptacle, each end receptacle having a hinged and latched perforate cover which is provided on its middle portion with a handle.

4. In a combination fish and bait bucket, a main vessel comprising a bottom that is oval in plan, a side wall on the bottom that is oval in plan, a floor supported by the side wall above said bottom and having a doorway therein, and a bail connected with said side wall, in combination with a plurality of bait receptacles having each a partially oval shape in plan, each receptacle having also a straight side wall portion and a cover hinged to said straight portion.

5. In a combination fish and bait bucket, the combination with a main vessel having a bottom that is oval in plan, an elliptically curved side wall, a bail connected with the side wall, and a floor supported by said wall above said bottom, of a plurality of bait receptacles having bottoms removably supported upon the floor and having each an elliptically-curved wall portion and a straight wall portion, each receptacle having a latch on its wall opposite to the straight wall portion, and covers hinged to the straight wall portions of the receptacles respectively and having an opening to receive the latch, each cover having a handle on its middle portion.

In testimony whereof, I affix my signature in presence of two witnesses.

HERBERT H. PETTY.

Witnesses:
   E. T. SILVIUS,
   F. M. ROEDER.